May 6, 1969　　　　A. J. MORTIMER　　　　3,443,188
SWITCHING CIRCUITS
Filed Feb. 27, 1967

Inventor:
AUSTIN J. MORTIMER
By Edward J. Norton
Attorney

United States Patent Office 3,443,188
Patented May 6, 1969

3,443,188
SWITCHING CIRCUITS
Austin J. Mortimer, Oldwick, N.J., assignor to Radio Corporation of America, a corporation of Delaware
Filed Feb. 27, 1967, Ser. No. 618,801
Int. Cl. H02p 5/00; H02k 27/20; G05b 5/01
U.S. Cl. 318—332
6 Claims

ABSTRACT OF THE DISCLOSURE

There is disclosed a switching circuit for use with a motor-driven load wherein changes in the load factor are automatically compensated for by an increase in supplied power to the input terminals of the motor. The circuit utilizes a triac, an RC time constant circuit, and a feedback element, wherein changes in power requirements of the motor are sensed by the feedback element which then operates to compensate the net effect of the time constant circuit used to trigger the triac in a manner whereby the conduction angle of the triac is advanced or retarded as the case may be.

In the operation of motor-driven equipment it is often desirable to maintain a constant speed to the output shaft of the driving motor so that the performance of the driven mechanical load can be maintained, independent of variations in the load factor.

One example of such a load would be a household electric mixer which is regularly used in the preparation of food in a variety of ways. Should the housewife attempt to prepare a batter for the baking of a cake, she might first put some of the required ingredients into the bowl of the mixer and then proceed to set the control thereof to operate the rotating beater arms at the desired speed. The fact that the various ingredients might have differing consistencies would result in exposing the motor which drives the beater arms to varying degrees of torsional resistance until such time that the consistency of the batter became more uniform. Thereafter it might be necessary to add some additional ingredients which might further tend to slow down or speed up the operation of the motor depending on the consistency of the added ingredient relative to the consistency of the batter already in the bowl.

Further examples of such equipment include power-driven tools for both home or commercial use. In applying a rotating electric drill to a workpiece the motor of the drill is suddenly put in contact with an increased load which has the effect of tending to cause it to slow down. This problem is overcome in commercial power tools by overdesigning the motor requirements which drive the tool. In the case of power tools for the hobbyist or home owner a prerequisite is generally to keep the cost of the tool as low as possible thereby making such over-designs an impractical solution. Recently, circuits have been introduced for controlling the operation of a power tool, such as a drill, whereby the speed of the tool may be varied in response to the pressure applied to a trigger element mounted on the chassis of the tool. This type of circuit, although an improvement over the prior art, still presents a problem because the speed of the motor can very easily be advanced beyond the point desired by virtue of the application of an excess of trigger pressure.

Accordingly it is an object of the present invention to provide an improved circuit for supplying power to a motor-driven load wherein the operation of the motor can be maintained at a constant level of performance.

A further object is to provide such an improved circuit which is self-regulating and which, when set, continues to operate at constant speed and automatically compensates to adjust the supplied power so as to maintain such constant speed despite variations in the mechanical load being driven by the motor.

It is a further object of the present invention to provide such a self-regulating circuit in a manner whereby it will be relatively inexpensive to produce for, and install in, motor-driven appliances.

In accordance with one embodiment of this invention, the terminal electrodes of a controlled bidirectional switching device, such as a triac, are connected in series with a motor-driven load, through a feedback resistance, and across a pair of input terminals to which a source of alternating current may be connected. A time constant circuit for determining the conduction angle of the triac is connected across the series combination including the triac and feedback resistor, and is further connected to the control electrode (gate) of the triac.

The operation of the circuit is such that when the load to be supplied is essentially constant the time constant circiut maintains a fixed conduction angle at which point the triac will switch from its nonconducting to its conducting state during every half cycle of supply voltage. Should the load begin to vary, increase for example, the electrical characteristics of the motor will result in its attempting to instantaneously supply the additional required power to the load so that it (the motor) may maintain its own operation at a constant level. This will result in a surge of current from the source which will be sensed by the feedback resistance causing the time constant circuit to adjust the conduction angle of the triac during successive half cycles of supply voltage thereby permitting the circuit to automatically supply the increased power required by the load on a steady-state basis.

The present invention will be more fully understood when the following description is read in conjunction with the accompanying figures in which.

Before proceeding further with a detailed explanation of the operation of the disclosed circuit it would perhaps be advisable to set forth a cursory description of the nature of the operation of the semiconductor element used therein and referred to as a triac.

Triac is a generic term which has been coined to identify the A.C. semiconductor switch equivalent of the triode.

As a semiconductor device the triac operates in a manner similar to the silicon controlled rectifier (SCR). Both are triggered into conduction upon the application of a signal to its control or "gate" electrode when a given potential difference exits across the terminal electrodes of the device, and remain in a conductive state until the potential across their terminal electrodes drops below a predetermined value which approaches zero in magnitude. The significant distinction between the triac and the SCR is that the triac is capable of conducting current in two directions while the SCR is capable of conducting current in only one direction.

Figure 1:
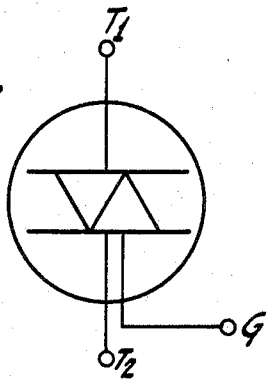
FIG. 1 is a circuit representation of a triac, as used in this application.

FIG. 1 represents the circuit symbol for the triac as used in this application. When the potential difference across terminals $T_1$ and $T_2$ is such that $T_1$ is positive with respect to $T_2$, the application of an appropriate signal to the control electrode G will cause the device to be switched into a conducting state permitting the flow of conventional current to pass from $T_1$ to $T_2$. Furthermore, when the potential difference across terminals $T_1$ and $T_2$ is such that $T_1$ is negative with respect to $T_2$, the application of an appropriate signal to the control electrode G will cause the device to be switched into a conducting state resulting in the flow of conventional current from $T_2$ to $T_1$.

Figure 2:
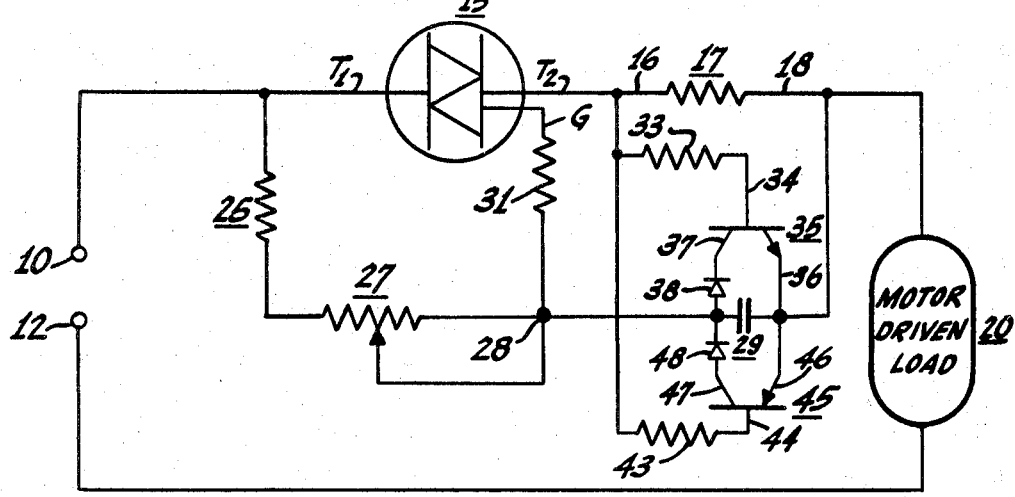
FIG. 2 is a circuit diagram representing one embodiment of a circuit employing the present invention.

Referring now to the embodiment of the present invention disclosed in FIG. 2, one terminal 10 of an alternating current source (not shown) is connected to terminal $T_1$ of a triac 15. Terminal electrode $T_2$ of triac 15 is connected to one terminal 16 of a resistor 17, the other terminal 18 of the resistor 17 being connected to one terminal of a motor driven load 20. The second terminal of the load 20 is connected to the second terminal 12 of the alternating current source. A time constant circuit comprising a first resistor 26, a variable resistance element 27, and a capacitor 29, connected in series in the order named, is connected across terminal electrode $T_1$ of the triac 15 and terminal 18 of resistor 17. The gate electrode G of the triac 15 is connected through a resistor 31 to the junction 28 formed by the connection of the variable resistance element 27 to capacitor 29. Terminal electrode $T_2$ of the triac 15 is connected through a resistor 33 to the base 34 of an NPN transistor 35. The emitter 36 of transistor 35 is connected to terminal 18 of resistor 17 while its collector 37 is connected through a first diode 38 to junction 28; the diode 38 being poled to conduct conventional current toward the collector 37. Terminal electrode $T_2$ of the triac 15 is further connected through a resistor 43 to the base 44 of a PNP transistor 45. The emitter 46 of transistor 45 is connected to terminal 18 of resistor 17 while its collector 47 is connected through a second diode 48 to junction 28; the diode 48 being poled to conduct conventional current toward junction 28.

Turning now to the operation of the circuit disclosed in FIG. 2, when a source of alternating current is connected across terminals 10 and 12, a charging circuit is completed via resistor 25, resistance element 27, capacitor 29, and the load 20. Assuming for the purpose of example that terminal 10 swings positive with respect to terminal 12, capacitor 29 will begin to charge with the side closest to junction 28 (hereinafter referred to as side 28) charging positive with respect to the side closest to terminal 18 (hereinafter referred to as side 18). Since both resistor 25 and the load are assumed to have fixed impedances the rate of charge of the capacitor is a function of the value of the impedance of the variable resistance element 27. When the charge across capacitor 29 reaches a level such that the gate electrode G of the traic 15 sees approximately one milliampere at five volts through resistor 31, the triac will be triggered into conduction and current will flow therethrough from $T_1$ to $T_2$. Once triggered the triac will remain in conduction for the remainder of the half cycle, i.e., until the voltage across terminals $T_1$ and $T_2$ approaches zero. During the time that the triac remains in conduction and current is supplied to the load a voltage drop occurs across the feedback resistor 17, said drop being proportional to the current I passing therethrough. The polarity of this drop tends to bias transistor 35 in a forward direction causing it to become more or less conductive; the degree of conduction which the transistor 35 will attain being proportional to the magnitude of the voltage drop across resistor 17. The effect of transistor 35 becoming more conductive is to hasten the discharge of capacitor 29 towards zero.

Figure 3:
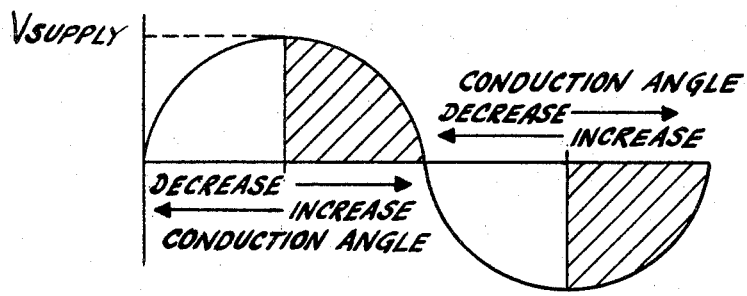
FIG. 3 is a diagrammatic representaiton of a supply voltage utilized to operate the motor-driven load referred to herein.

During the successive half cycle of supply voltage the operation of the circuit is essentially repeated but for the fact that the charge upon capacitor 29 is reversed, i.e., side 18 charging positive with respect to side 28. The operation of the feedback circuit is also analogous; once the triac begins to conduct, current flows from terminal 12 through the load 20, the feedback resistor 17 and the triac 15, the voltage drop across resistor 17 now being of a polarity such that transistor 45 is biased into varying degrees of conduction depending upon the magnitude of said voltage drop. Again, the degree of transistor conduction (45 in this case) affecting the discharge rate of capacitor 29. If, at the time this second half cycle begins, the charge which was placed upon capacitor 29 during the previous half cycle has decayed to zero, the circuit will operate in the same manner and the conduction angle of the triac will be comparable, i.e., the triac will be triggered into conduction at the same point of time relative to the beginning of the half cycle and the load will receive an identical amount of power (see FIG. 3). If on the other hand the charge on the capacitor has not decayed to zero by the beginning of the successive half cycle it must first continue to discharge until it achieves this result before it can commence charging with an opposite polarity.

To better understand the operation of the circuit let us assume that the variable resistance element 27 has been initially set and that the load is operating at a fixed power factor. Should the mechanical load which is being driven by the motor be suddenly increased in some manner there will occur an instantaneous surge of current from the source, through the triac, to the motor which will attempt to maintain a constant speed on the motor. This will occur because the flux linkages within the motor cannot change instantaneously. One effect of this increase in current is to increase the voltage drop across the feedback resistor 17 thereby increasing the bias of transistor 35 (or transistor 45 depending on the polarity of the source voltage), forcing the transistor further into conduction and hastening the discharge of capacitor 29. This has the effect of increasing the conduction angle of the triac during the subsequent half cycle of operation by decreasing the net period of time that the triac has to wait before it is again triggered into conduction. Should the load suddenly decrease on the other hand, the phenomenon is reversed with the voltage drop across resistor 17 decreasing, the transistor becoming less conductive and the discharge time of capacitor 29 increasing thereby decreasing the conduction angle of the triac during the subsequent half cycle of operation.

The maximum conduction angle is achieved when the value of the variable resistance element 27 is set at a minimum and the discharge of the capacitor is completed prior to the commencement of the subsequent half cycle of supply voltage. In such a case the conduction angle becomes strictly a function of resistor 25 and resistor 27. Once the value of the variable resistance element 27 is set however, the circuit will operate automatically to adjust the amount of supplied power to the motor-driven load so that the performance thereof will remain unchanged despite variations of the mechanical load being driven.

What is claimed is:

1. A switching circuit for controlling the supply of power to a motor driven load comprising:
    (a) a controlled bidirectional gate device having first and second main terminal electrodes and a control electrode, said device being rendered conductive in a first direction between said terminal electrodes when a signal of sufficient value and of a given polarity is applied to said control electrode and when a voltage above a threshold value and of one polarity is applied between said first and second terminal electrodes, said device being rendered conductive in the opposite direction between said terminal electrodes when a signal of sufficient value and of a given polarity is applied to said control electrode and when a voltage above a threshold value and of a polarity opposite to said one polarity is applied between said terminal electrodes;
    (b) a time constant circuit for supplying said signal to said control electrode;
    (c) means for charging said time constant circuit;

(d) circuit means coupling said time constant circuit to said control electrode of said gate device;

(e) a feedback element positioned to sense changes in the power requirements of said motor driven load; and (f) second circuit means for effecting the discharge rate of said time constant circuit, said second circuit means coupling said feedback element to said time constant circuit, the instant at which said time constant circuit supplies said signal to said control electrode being conditioned upon the power requirements of the motor-driven load as sensed by said feedback element.

2. A switching circuit as described in claim 1 wherein said second circuit means includes a transistor element, the degree of conduction of said transistor element being dependent upon the electrical condition of said feedback element.

3. A self-regulating switching circuit comprising:
(a) a controlled bidirectional gate device having first and second main terminal electrodes and a control electrode said device being rendered conductive in a first direction between said terminal electrodes when a signal of sufficient value and of a given polarity is applied to said control electrode and when a voltage above a threshold value and of one polarity is applied between said first and second terminal electrodes, said device being rendered conductive in the opposite direction between said terminal electrodes when a signal of sufficient value and of a given polarity is applied to said control electrode and when a voltage above a threshold value and of a polarity opposite to said one polarity is applied between said terminal electrodes;

(b) a load device;

(c) a first input terminal and a second input terminal adapted for connection to a source of alternating current, said first input terminal being connected to said first main electrode of said bidirectional gate device, said second input terminal being connected to one end of said load device;

(d) a feedback element connected between said second main electrode of said gate device and the second end of said load device, the voltage drop across said feedback element being proportional to the current flow through said load device; and (e) circuit means including a capacitor connected across said gate device and said feedback element, the discharge rate of said capacitor being dependent upon the voltage drop across said feedback element.

4. A switching circuit for use with a load comprising:
(a) a triac element having first and second main electrodes and a control electrode;
(b) first and second output terminals for connection to said load;
(c) first and second input terminals for connection to a source of alternating current, said first input terminal being connected to said first main electrode of said triac, said second input terminal being connected to said first output terminal;

(d) a feedback resistance connected on one end to said second main electrode of said gate device and on the other end thereof to said second output terminal;

(e) a resistor, a variable resistance element, and a capacitor, connected in series in the order named across said first main terminal electrode and said second output terminal;

(f) biasing means connected on one end to the junction formed by said variable resistance element and said capacitor, and on the other end thereof to said control electrode of said device; and (g) circuit means coupled to said capacitor and to said feedback resistance, said circuit means operating to affect the rate of discharge of said capacitor in response to the voltage drop across said feedback resistance.

5. A switching circuit as described in claim 4 wherein said circuit means comprises a transistor element, the collector and emitter of which are connected across said capacitor, the voltage drop across said feedback resistance operating as a biasing voltage for said transistor element whereby the discharge time of said capacitor is directly proportional to the voltage drop across said feedback resistor.

6. A switching circuit for controlling the supply of power to a load comprising:
(a) a triac element having first and second main electrodes and a control electrode;
(b) a time constant circuit for supplying a control signal to said control electrode;
(c) means for charging said time constant circuit;
(d) circuit means coupling said time constant circuit to said control electrode;
(e) a feedback element positioned to sense changes in the power requirements of said load; and
(f) second circuit means for effecting the rate of said time constant circuit, said second circuit means coupling said feedback element to said time constant circuit, the instant at which said time constant circuit supplies said signal to said control electrode being conditioned upon the power requirements of the load as sensed by said feedback element.

References Cited

UNITED STATES PATENTS 3,346,874  10/1967  Howell _____ 307—88.5

ORIS L. RADER, *Primary Examiner.*

G. NUNEZ, *Assistant Examiner.*

U.S. Cl. X.R.

307—252, 305; 318—341; 323—4, 38